United States Patent Office 2,714,104
Patented July 26, 1955

2,714,104

PREPARATION OF P-ALKYLAMINOAZO-BENZENES

Joseph A. Chenicek, Bensenville, and William K. T. Gleim, Orland Park, Ill., assignors to Universal Oil Products Company, Des Plaines, Ill., a corporation of Delaware No Drawing. Application July 31, 1953, Serial No. 371,727

15 Claims. (Cl. 260—205)

This invention relates to a process for preparing p-alkylaminoazobenzenes, and more particularly to a process for the preparation of p-sec-butylamino-azobenzene.

It is an object of this invention to prepare a p-alkylaminoazobenzene by diazotizing primary aromatic amines and coupling the diazonium salt directly with an N-alkylaniline in the para position.

A further object of this invention is to prepare a p-alkylaminoazobenzene by diazotizing an aromatic amine in the presence of lactic acid and to couple the resultant phenyl diazonium organic acid salt with an N-alkylaniline directly in the para position in one step without going through the diazoamino intermediate.

A still further object of this invention is to prepare an oxidation inhibitor for gasoline by diazotizing aniline or p-nitroaniline in the presence of lactic acid, coupling the resultant phenyl diazonium salt with an N-alkyl-aniline, and reductively alkylating the p-alkylamino-azobenzene formed thereby with a ketone in the presence of a hydrogenation catalyst and hydrogen to form an N,N'-di-alkyl-p-phenylene diamine.

An embodiment of this invention resides in a process for the preparation of a p-alkylaminoazobenzene which comprises diazotizing lactic amine in the presence of an organic acid, and coupling the resultant phenyl diazonium organic acid salt with an N-alkylaniline directly in one step without going through the diazoamino intermediate.

Another embodiment of this invention resides in a process for the preparation of a p-alkylamino-azobenzene which comprises diazotizing aniline in the presence of an excess of an organic acid solvent consisting of lactic acid, and coupling the resultant phenyl diazonium lactate with an N-alkylaniline.

A further embodiment of this invention is found in the process of the preparation of a p-alkylamino-azobenzene such as p-sec-butylamino-azobenzene, which comprises diazotizing aniline with sodium nitrite in the presence of an organic acid solvent consisting of lactic acid and coupling the resultant phenyl diazonium lactate with an N-alkylaniline.

A specific embodiment of this invention is found in the preparation of p-sec-butylamino-azobenzene, by diazotizing aniline with sodium nitrite in the presence of an excess of lactic acid and coupling the resultant phenyl diazonium lactate with N-sec-butylaniline.

A more specific embodiment of this invention resides in the preparation of p-sec-butylamino-azobenzene which comprises diazotizing aniline with sodium nitrite in an excess of lactic acid at a pH ranging from about 1.6 to 2.2, coupling the resultant diazonium lactate with N-sec-butylaniline at temperatures ranging from about +10° C. to about —20° C. and at a pH ranging from from about 2.0 to about 2.5, treating the p-sec-butyl-amino-azobenzene formed thereby with caustic or ammonia and crystallizing the product from ether.

A still more specific embodiment of this invention is found in a process for the preparation of an oxidation inhibitor which comprises diazotizing aniline with sodium nitrite in an excess of lactic acid at a pH ranging from about 1.6 to about 2.2, coupling the resultant phenyl diazonium lactate with N-sec-butylaniline at temperatures ranging from about +10° C. to about —20° C. and at a pH ranging from about 2.0 to about 2.5, neutralizing the p-sec-butylamino-azobenzene formed thereby with caustic or ammonia, crystallizing said product from ether, and reductively alkylating said p-sec-butylamino-azobenzene with a ketone such as methyl ethyl ketone in the presence of hydrogen and a hydrogenation catalyst at elevated temperatures and pressure to form N,N'-di-sec-butyl-p-phenylene diamine.

Other objects and embodiments of the present invention relating to alternative p-alkylamino-azobenzenes and N-alkylanilines which may be used as reactants will be set forth in the following further detailed description of the invention.

Heretofore, the theories of coupling were that coupling with amines occurs only at low acidity and that the diazoamino compound is formed first and has to be rearranged in a second step to form the p-aminazo compound according to the following equation:

I

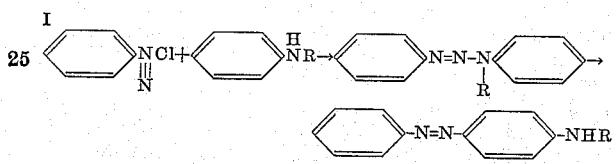

in which R equals an H, alkyl or aryl substituent.

It has now been discovered that it is possible to couple a diazonium salt with an amine to obtain a p-aminoazobenzene in one step, said coupling being carried out in a solvent comprising lactic acid. This was substantiated by coupling diazobenzene with sec-butylaniline at —10° C. and treating the reaction product immediately, without any previous heating, with concentrated ammonia and ether. The ether solution was evaporated and the residue therefrom solidified without any further purification. The melting point of this compound was 49° C. as compared to a melting point of 54° C. for pure p-sec-butylamino-azobenzene. The yield of the product amounted to 97%, which, taking into consideration the mechanical losses involved, is practically quantitative.

Actually, it is not necessary to use a solvent such as ether for the isolation of the p-alkylaminoazobenzene. The p-alkylamino-azobenzene will precipitate quantitatively from the reactive solution after its formation. It can then be separated from the reaction solution either by filtration or by centrifugation, and the reaction medium can be recycled. This reaction strongly indicates that coupling occurs directly in the para position and not first to the diazoamino compound due to the fact that the coupling product was not heated. No rearrangement could have taken place once the diazoamino compound is formed inasmuch as said compound must be heated at an elevated temperature and in the presence of a weakly acidic medium to effect the rearrangement to the p-aminoazobenzene. This process would be advantageous in producing p-alkylamino-azobenzenes such as p-sec-butyl-amino-azobenzene which is useful as an intermediate in the preparation of N,N'-di-sec-butyl-p-phenylene diamine, said diamine being an antioxidant for gasoline. The starting materials in such a process would comprise aniline, lactic acid, and sec-butylaniline. These compounds are much cheaper than p-nitroaniline which is the starting material now being used in the preparation of the above identified antioxidant. Therefore, the present invention provides an alternate route for producing the above mentioned antioxidants at less cost. A simple method of preparing the aforementioned antioxidant would be to reductively alkylate p-sec-butylamino-azobenzene with methylethyl ketone according to the following equation:

II

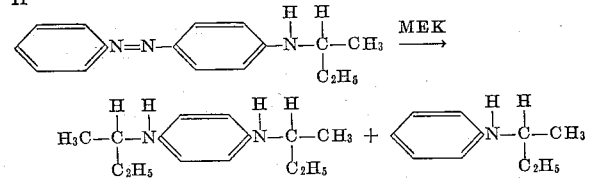

As noted, the products of this reaction are N,N'-di-sec-butyl-p-phenylene diamine and N-sec-butylaniline, the latter compound being used as part of the starting material in the preparation of the p-sec-butylamino-azobenzene.

The primary aryl amines besides aniline which may be used in this process include primary C-alkyl aromatic amines such as p-methyl aniline, o-toluidine, m-toluidine, p-ethyl aniline, p-propyl aniline, α-naphthylamine, β-naphthylamine, etc., α-methyl naphthylamine, β-methyl naphthylamine, dimethyl naphthylamine, α-ethyl naphthylamine, β-ethylnaphthylamine, etc.; nitro aromatic amines such as p-nitroaniline, 2,4-dinitroaniline, 2,5-dinitroaniline, nitro-1-naphthylamine, 1-nitro-2-naphthylamine, 6-nitro-1-naphthylamine, 8-nitro-2-naphthylamine, etc.; C-halogen substituted aromatic amines such as p-chloroaniline, 2,4-dibromoaniline, 2,5-dibromoaniline, 2,4,6-trichloroaniline, etc., 2-chloro-1-naphthylamine, 6-chloro-1-naphthylamine, 2-bromo-1-naphthylamine, etc.; and C-sulfonic acid aromatic amines such as naphthylamine-3-sulfonic acid, naphthylamine-5-sulfonic acid, naphthylamine-8-sulfonic acid, 1-naphthylamine-2,7-disulfonic acid, 1-naphthylamine-3,7-disulfonic acid, etc., 1-naphthylamine-2,4,7-trisulfonic acid, 1-naphthylamine-3,6,8-trisulfonic acid, 1-naphthylamine-8-hydroxy-3,6-disulfonic acid, etc.

In the preferred embodiment of this invention, aniline is diazotized with sodium nitrite in the presence of lactic acid, to form the phenyl diazonium salt of lactic acid. The phenyl diazonium salt is then coupled with sec-butylaniline to form p-sec-butylamino-azobenzene. In this preferred embodiment of the invention, the reactions proceed according to the following equations:

III

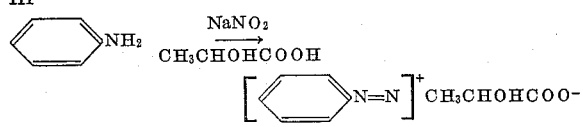

IV

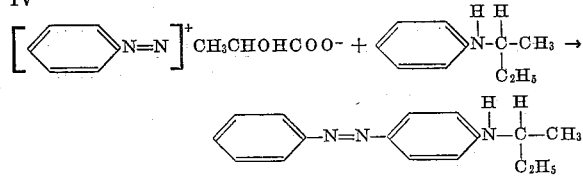

N-monoalkylanilines which may also be used in this process include N-methyl aniline, N-ethyl aniline, N-butylaniline, N-propyl aniline, etc. Other ketones which may be used in the reductive alkylation of the p-alkylamino-azobenzene include diethyl ketone, methyl propyl ketone, ethyl propyl ketone, dipropyl ketone, propyl butyl ketone, dibutyl ketone, etc. The use of the aforementioned alkylanilines and ketones will result in various N,N'-dialkyl-p-phenylene diamines which may be used as oxidation inhibitors although not necessarily with equivalent results.

The preparation of a p-alkylamino-azobenzene which is one of the starting materials in the preparation of oxidation inhibitors of the N,N'-di-alkyl-p-phenylene diamine type usually encounters difficulties inasmuch as the azobenzene must be obtained in a relatively pure state and with high yields. It has been discovered that a small amount of tarry by-products can effectively obstruct the crystallization of the desired end product. Starting with aniline the diazotization is performed by reacting said aniline with a diazotizing agent such as nitrous acid, etc. In the event that nitrous acid is used as the diazotizing agent the problem of impurities arises. For example, when equivalent amounts of aniline are diazotized with an equivalent amount of nitrous acid there is a chance that either one or the other is in excess. If aniline is in excess, it will couple with its own diazohydroxide to form either the diazoaminobenzene or the p-aminoazobenzene. However, if the nitrous acid is in excess, it will react with the sec-butylamine during the subsequent coupling reaction to form N-nitroso-sec-butylaniline. Therefore, when aniline is diazotized with nitrous acid, an excess of approximately 0.1 mol of nitrous acid is used; the excess then being destroyed by the addition of urea.

The lactic acid supplies two necessary conditions for the subsequent coupling reaction, first providing the proper acidity, and secondly acting as a solvent. Therefore, the proper acidity and the proper solvent, or, the proper acidity in the proper solvent are necessary prerequisites for the complete coupling of the diazonium salt and the alkylaniline. It has further been found that an excess of lactic acid must be present during the diazotization and coupling. In order to obtain satisfactory yields of coupling, at least 8 moles of lactic acid must be applied for 1 mole of aniline plus 1 mole of sec-butylaniline. The concentration of the acid must be sufficient to maintain a pH of from 1.6 to 2.5. The concentration of lactic acid should be approximately 75–90% in order to obtain satisfactory yields of the desired oxidation inhibitor, although the concentration can be lowered provided the ratio of acid to aniline remains sufficiently high, that is about 10 to 1. Where only 5 moles of lactic acid are used, approximately 35% of the sec-butylaniline remains unreacted, whereas when 8 moles of acid are used only 10% of the sec-butylaniline remains unreacted.

The diazotization and coupling reaction are carried out at low temperatures, usually below 0° C. and ranging from +10° C. to −20° C., the preferred range being from about 0° C. to about −10° C. These low temperatures are effected by the use of external cooling means, which comprises Dry Ice. It is contemplated that an inorganic mineral acid may be substituted for a portion of the lactic acid in order that regular ice may be used as a cooling agent.

The p-sec-butylamino-azobenzene is reductively alkylated with methyl ethyl ketone in the presence of the hydrogenation catalyst at elevated temperatures ranging from about 100° C. to about 180° C. or more, the preferred range being from 120° C. to about 150° C. Any hydrogenation catalyst may be used in this process including members of group VIII of the periodic table such as iron, cobalt, nickel, platinum, palladium, and the sulfides of the aforesaid metals. Molybdenum sulfide and platinum supported on an inorganic carrier such as alumina may also be used as hydrogenation catalysts in this reaction, the preferred catalyst being a platinum, alumina, combined halogen composite known in the trade as Platforming catalyst. As hereinbefore stated the reductive alkylation of the p-sec-butylaminoazobenzene with methylethyl ketone will result in the formation of N,N'-di-sec-butyl-p-phenylene diamine and sec-butylaniline which may be recycled as a part of the feed stock in the preparation of p-sec-butylamino-azobenzene.

The process of the present invention may be carried out in any suitable manner and may be either a batch or continuous type of operation. When a batch type operation is used, a quantity of the starting materials, namely, aniline and the diazotizing agent, along with the solvent comprising lactic acid are added to a reaction vessel equipped with a mixing and cooling device. A cooling agent, such as Dry Ice, may then be added to the vessel while the aforementioned reactants are being stirred or shaken. After diazotization of the aniline has taken place, the coupling step is also carried out at low temperatures by adding the desired alkyl aniline, such as sec-butylaniline to the diazotation reaction product. After all of the sec-butylaniline has been added, the temperature is maintained below 0° C. for a predetermined time after which the temperature is allowed to rise until atmospheric temperature has been reached, the reaction mixture then being maintained at this temperature for a predetermined time. A calculated amount of urea is added to neutralize the excess nitrous acid, after which the reaction mixture is taken up in ether and an alkaline compound to remove all the remaining organic acid which may be present.

The desired alkyl amino-azobenzene compound is then isolated by evaporating the ether, and subjected to reductive alkylation in a second reaction vessel in the presence of a ketone, such as methyl ethyl ketone, and a hydrogenation catalyst, said second reaction vessel being equipped with gas introducing means whereby a stream of hydrogen gas is introduced into the vessel. The vessel is maintained at predetermined superatmospheric pressure until the reaction is completed. The oxidation inhibitor is then filtered from the hydrogenation catalyst and subjected to fractional distillation to recover the desired end product.

Another method of operation in the present process is of the continuous type. In this process the reactants comprising aniline, the diazotizing agent, and the lactic acid solvent are admitted into a reaction vessel equipped with cooling means or with means for introducing a cooling agent such as Dry Ice. The diazonium lactate is led off from this reaction zone into a second reaction zone also maintained at low temperatures by external or internal cooling means, where the coupling with the N-alkylaniline such as sec-butylaniline takes place. The p-alkylamino-azobenzene is led out of this second reaction zone into a third reaction zone where it is neutralized with caustic or ammonia and taken up in ether. The ether solution is then led to still another reaction zone where the reductive alkylation of the p-alkylamino-azobenzene occurs. A particularly suitable type of operation of the reductive alkylation step comprises a fixed bed type in which the hydrogenation catalyst, such as nickel, is disposed as a bed in the reaction zone and the alkylamino-azobenzene such as p-sec-butylamino-azobenzene is passed therethrough in either an upward or downward flow while being subjected to the stream of hydrogen gas being admitted into said reaction zone. The reaction products, namely the N,N'-di-alkyl-p-phenylene diamine and N-sec-butylaniline are then separated by fractional distillation, while the alkylaniline is recycled back to the second reaction zone for use as a portion of the coupling feed stock.

Another continuous type of process is the fluidized type of operation in which the alkylamino-azobenzene and the catalyst are maintained in a state of turbulence under hindered settling conditions in the reaction zone. Other continuous type of processes include the compact moving bed type of operation in which the hydrogenation catalyst and the reactant, namely, the alkylamino-azobenzene and the ketone are passed either concurrently or countercurrently to each other.

Still another type of continuous process is the slurry type process in which the catalyst is carried into the reaction zone as a slurry in the ketone and alkylaminoazobenzene. In each of the aforementioned types of processes the unreacted materials may be separated out and recycled for use as a portion of the feed material while the desired product is withdrawn. It is to be also noted that in each of the aforementioned types of processes the alkylamino-azobenzene is subjected to a stream of hydrogen gas while undergoing the reductive alkylation with the ketone in the presence of a hydrogenation catalyst.

The following examples are given to illustrate the process of the invention, which, however, are not intended to limit the generally broad scope of the present invention in strict accordance therewith.

*Example I*

10 grams of aniline were diazotized with 8 g. of concentrated sodium nitrite in water solution in 100 g. of 90% lactic acid at a temperature of approximately −15° C. To obtain the necessary efficient and instantaneous internal cooling, powdered Dry Ice was added to the solution while said solution was being stirred, after which the pH was measured and found to be 1.8. After the last of the sodium nitrite had been added a small amount of urea was introduced and the coupling reaction was carried out at −10° C. by adding the sec-butylaniline to the reaction mixture. The temperature was maintained below 0° C. for an additional two hours after the sec-butylaniline had been introduced, the pH of the solution at this time being 2.3. At the end of this time the reaction mixture was allowed to rise to room temperature and kept there for a period of approximately twenty hours, after which time the reaction product had settled out. The reaction medium was decanted and the reaction product was taken up in ether, after which the solution was washed with an ammonia solution to remove the remaining lactic acid. The ether solution was then dried and evaporated, the 26 g. of crystallizable material being p-sec-butylamino-azobenzene, with an M. P. of 54°, corresponding to 99% yield.

The p-sec-butylamino-azobenzene was then subjected to reductive alkylation with methyl ethyl ketone in the presence of 4 grams of Platforming catalyst for every 0.25 mol of substance, and 8 to 10 mols of methyl ethyl ketone for every mol of substance, at a temperature of 160° C. and at a superatmospheric pressure of 125 atmosphere of $H_2$.

The reductive alkylation was considered completed when the hydrogen uptake had dropped to a very low rate, for example, about one atmosphere of hydrogen for one to two hours. The product was filtered from the catalyst and subjected to fractional distillation. The different fractions of the distillations were identified by means of a combination of boiling point determinations, refractive indices and induction periods in gasoline.

*Example II*

14 g. of p-nitroaniline were diazotized with 8 g. of concentrated sodium nitrite in 100 g. of 90% lactic acid under conditions similar to those set forth in Example I. The solution was cooled with Dry Ice and coupled by adding sec-butylaniline to the reaction mixture. The pH during the first step was 1.8 and during the latter step was 2.2. The reaction product was taken up in ether after the reaction medium had been decanted, washed with ammonia, dried and recrystallized, said reaction product being 4-sec-butylamino-4'-nitro-azobenzene.

2 moles of N,N'-sec-butyl-p-phenylene diamine are then obtained by reacting the above mentioned azobenzene with methyl ethyl ketone.

We claim as our invention:

1. A process for the preparation of an alkylamino-azoaryl compound which comprises diazotizing a primary aryl amine with a diazotizing agent selected from the group consisting of sodium nitrite and nitrous acid in the presence of lactic acid of a concentration of from about 75% to about 90%, and directly coupling the resultant diazonium lactate with an N-alkyl aniline.

2. A process for the preparation of a p-alkylamino-azobenzene which comprises diazotizing a primary mononuclear aryl amine with a diazotizing agent selected from the group consisting of sodium nitrite and nitrous acid in the presence of lactic acid of a concentration of from about 75% to about 90%, and directly coupling the resultant diazonium lactate with an N-alkyl aniline.

3. A process for the preparation of a p-alkylamino azobenzene which comprises diazotizing an aniline with a diazotizing agent selected from the group consisting of sodium nitrite and nitrous acid in the presence of lactic acid of a concentration of from about 75% to about 90% and directly coupling the resultant diazonium lactate with an N-alkyl aniline.

4. A process for the preparation of a p-alkylamino azobenzene which comprises diazotizing an aniline with nitrous acid in the presence of an excess of lactic acid of a concentration of from about 75% to about 90% and directly coupling the resultant diazonium lactate with an N-alkyl aniline.

5. A process for the preparation of a p-alkylamino azobenzene which comprises diazotizing an aniline with sodium nitrite in the presence of an excess of an organic acid solvent consisting of lactic acid of a concentration of from about 75% to about 90%, and directly coupling the resultant diazonium organic acid salt with an N-alkyl aniline.

6. A process for the preparation of a p-alkylamino azobenzene which comprises diazotizing aniline with sodium nitrite in the presence of an excess of an organic acid solvent consisting of lactic acid of a concentration of from about 75% to about 90%, and directly coupling the resultant diazonium organic acid salt with an N-alkyl aniline at temperatures ranging from about +10° C. to about −20° C.

7. A process for the preparation of a p-alkylamino azobenzene which comprises diazotizing aniline with sodium nitrite in the presence of an organic acid solvent consisting of lactic acid of a concentration of from about 75% to about 90%, and directly coupling the resultant diazonium organic acid salt with an N-alkyl aniline at temperatures ranging from about +10° C. to about −20° C. at a low pH.

8. A process for the preparation of a p-sec-butylamino azobenzene which comprises diazotizing aniline with sodium nitrite in the presence of an organic acid solvent consisting of lactic acid of a concentration of from about 75% to about 90%, and directly coupling the resultant diazonium organic acid salt with sec-butylaniline at temperatures ranging from about +10° C. to about −20° C. at a low pH.

9. A process for the preparation of p-sec-butylamino azobenzene which comprises diazotizing aniline with sodium nitrite in the presence of lactic acid of a concentration of from about 75% to about 90%, and directly coupling the resultant diazonium lactate with sec-butylaniline at a low pH and at temperatures ranging from about +10° C. to about −20° C.

10. A process for the preparation of p-sec-butylamino azobenzene which comprises diazotizing aniline with sodium nitrite in the presence of an excess of lactic acid of a concentration of from about 75% to about 90% at a pH ranging from about 1.6 to about 2.2, and directly coupling the resultant diazonium lactate with sec-butylaniline at temperatures ranging from about +10° C. to about −20° C.

11. A process for the preparation of p-sec-butylamino azobenzene which comprises diazotizing aniline with sodium nitrite in the presence of an excess of lactic acid of a concentration of from about 75% to about 90% at a pH ranging from about 1.6 to about 2.2, and directly coupling the resultant diazonium lactate with sec-butylaniline at temperatures ranging from about +10° to about −20° C. and at a pH ranging from about 2.0 to about 2.5.

12. A process for the preparation of p-sec-butylamino azobenzene which comprises diazotizing aniline with sodium nitrite in the presence of an excess of lactic acid of a concentration of from about 75% to about 90% at a pH ranging from about 1.6 to about 2.2, and directly coupling the resultant diazonium lactate with sec-butylaniline at temperature of −10° C. and at a pH ranging from about 2.0 to about 2.5.

13. A process for the preparation of p-sec-butylamino azobenzene which comprises diazotizing aniline with nitrous acid in the presence of an excess of lactic acid of a concentration of from about 75% to about 90% at a pH ranging from about 1.6 to about 2.2, directly coupling the resultant diazonium lactate with sec-butylaniline at a temperature of about −10° C. and at a pH ranging from about 2.0 to about 2.5, neutralizing said p-sec-butylamino azobenzene, and crystallizing the product with ether.

14. A process for the preparation of p-sec-butylamino azobenzene which comprises diazotizing aniline with nitrous acid in the presence of an excess of lactic acid of a concentration of from about 75% to about 90% at a pH ranging from about 1.6 to about 2.2, directly coupling the resultant diazonium lactate with sec-butylaniline at a temperature of about −10° C. and at a pH ranging from about 2.0 to about 2.5, neutralizing said p-sec-butylamino azobenzene with a caustic neutralizing agent, and crystallizing the product from ether.

15. A process for the preparation of p-sec-butylamino azobenzene which comprises diazotizing aniline with sodium nitrite in the presence of an excess of lactic acid of a concentration of from about 75% to about 90% at a pH ranging from about 1.6 to about 2.2, directly coupling the resultant diazonium lactate with sec-butylaniline at a temperature of about −10° C. and at a pH ranging from about 2.0 to about 2.5, neutralizing said p-sec-butylamino azobenzene with ammonia, and crystallizing the product from ether.

References Cited in the file of this patent

UNITED STATES PATENTS

| 2,464,291 | Chenicek | Mar. 15, 1949 |
| 2,615,919 | Biswell | Oct. 28, 1952 |

OTHER REFERENCES

Saunders: The Aromatic Diazo Compounds, 2nd ed., 1949, page 5.

Van Bramer et al.: Abstract of appl'n Ser. No. 649,770, published November 27, 1951, 652—O. G. 1181.